United States Patent [19]

Schreyer et al.

[11] 4,068,467
[45] * Jan. 17, 1978

[54] FORGED MASTER LINK FOR SLING CHAIN DEVICES

[75] Inventors: Kenneth D. Schreyer, Clarence; Edward R. Behnke, Lockport, both of N.Y.

[73] Assignee: Columbus McKinnon Corporation, Tonawanda, N.Y.

[*] Notice: The portion of the term of this patent subsequent to Sept. 28, 1990, has been disclaimed.

[21] Appl. No.: 709,865

[22] Filed: July 29, 1976

[51] Int. Cl.² .............................................. F16G 13/12
[52] U.S. Cl. ...................................... 59/93; 294/78 R
[58] Field of Search ......................... 59/93, 90, 84, 78; 294/78 R, 78 A, 74

[56] References Cited

U.S. PATENT DOCUMENTS

| | | | |
|---|---|---|---|
| 1,713,901 | 5/1929 | Hanson | 294/74 |
| 2,315,146 | 3/1943 | White | 294/74 |
| 2,703,476 | 3/1955 | Donaldson | 59/93 |
| 2,925,299 | 2/1960 | Koons | 294/78 R |
| 3,360,293 | 12/1967 | Barthule | 294/74 |
| 3,527,493 | 9/1970 | Phares | 294/74 |
| 3,656,796 | 4/1972 | Cook | 294/78 R |
| 3,915,487 | 10/1975 | Zeiler | 294/78 R |

Primary Examiner—C.W. Lanham
Assistant Examiner—Gene P. Crosby
Attorney, Agent, or Firm—Bean, Kauffman & Bean

[57] ABSTRACT

A master link of forged metal construction features a multiple hole sling chain attachment arrangement serving to minimize bending moment deformation/failure stresses in the master link under various branch chain connection configurations; and reduces the number of special attachment links required to attach the branch chain(s) to the master link.

4 Claims, 5 Drawing Figures

U.S. Patent   Jan. 17, 1978   4,068,467
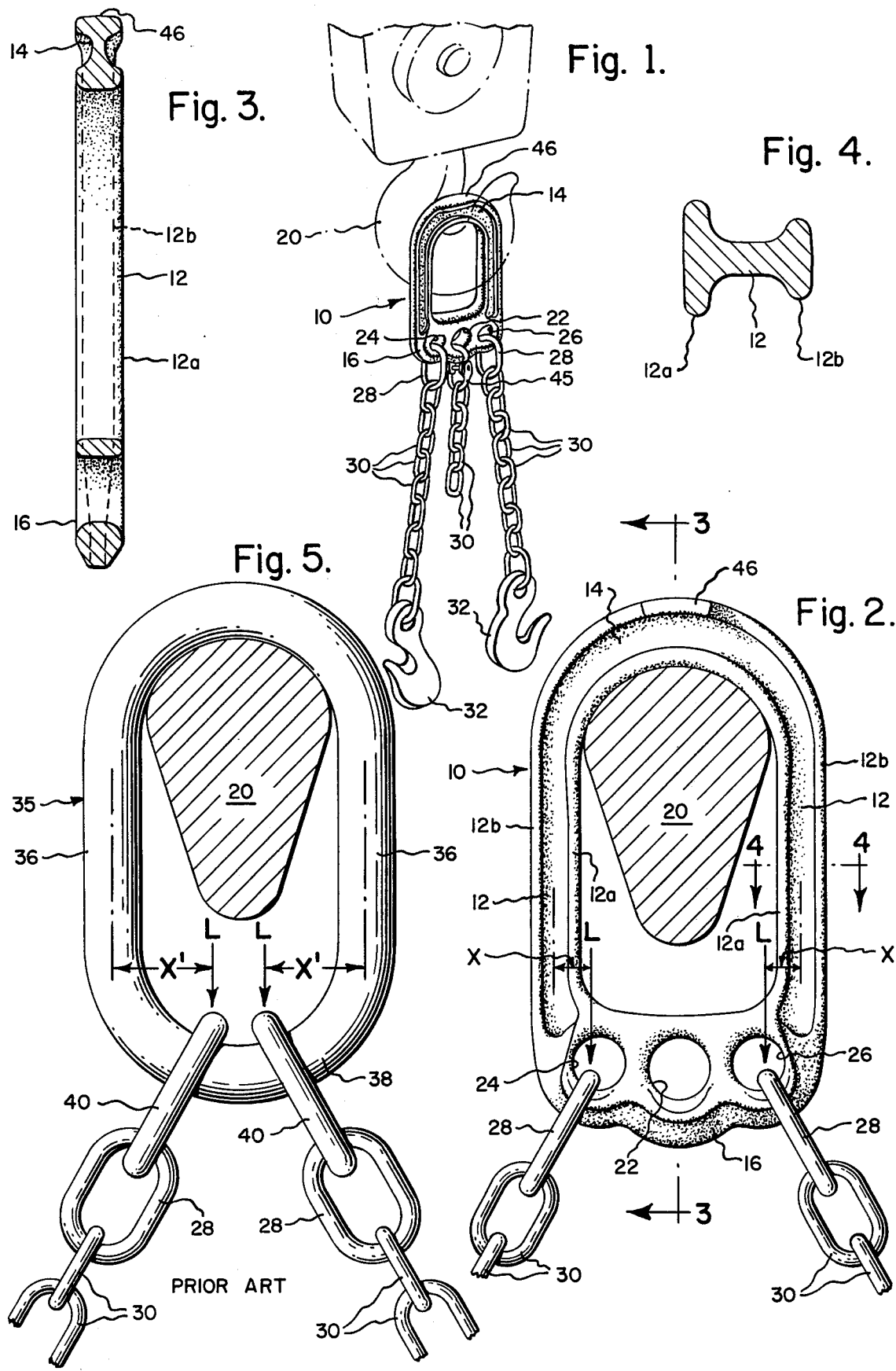

FORGED MASTER LINK FOR SLING CHAIN DEVICES

BACKGROUND AND OBJECTS OF THE INVENTION

Conventional "sling chain" devices normally include a welded bent wire type "master link" and one or more sling chain branches permanently coupled to and depending therefrom. Customarily, a "coupling link" is employed to interconnect each sling chain to the master link; such coupling link being sized and formed from wire stock of a diameter intermediate of that of the master link and of the links of the sling chain(s). In the case of sling devices wherein the master links are formed of large diameter wire stock, it has heretofore been necessary to additionally employ a "master coupling link" to interconnect the conventional coupling link to the master link. Moreover, master links of conventional welded bent wire type, wherein all of their parts are of uniform cross-sectional areas, necessarily require that the parts of the link which are not subject to high stress loadings are overbuilt in order to assure adequate strength in the other parts of the link. Hence, conventional master link constructions are characterized as being of high weight-to-strength ratios. The present invention provides an improved type forged master link construction for use in sling chain units, which obviates the aforesaid disadvantages of prior type master link constructions.

IN THE DRAWINGS

FIG. 1 is a perspective view of a sling chain unit incorporating a forged master link of the present invention;

FIG. 2 is a fragmentary side elevational view on enlarged scale of the unit shown in FIG. 1; the lift hook being shown in section;

FIG. 3 is a sectional view taken generally along the line 3—3 in FIG. 2;

FIG. 4 is a sectional view on enlarged scale taken generally along the line 4—4 in FIG. 2; and FIG. 5 is a view similar to FIG. 2, but illustrates a typical prior type master link of the welded bent wire link type construction.

DESCRIPTION OF THE PREFERRED EMBODIMENT

As illustrated at FIGS. 1-4 herewith, a preferred form of the master link of the invention is indicated generally by the numeral 10, and is forged from suitable high strength metal into a generally oblong configuration including substantially straight opposite side leg portions 12—12 appended by a semicircularly shaped hanging end portion 14 and a load carrying end portion 16. In order to stiffen the link against undesired deformations when in service the leg and end portions thereof are preferably forged into I-beam sectional form, as best illustrated at FIGS. 3-4. The inner wall surface of the end portion 14 is generally of semi-cylindrical configuration and sectionally rounded so as to adapt it to complement the shape of the bight portion of a supporting hook, such as is illustrated at 20, and to seat and smoothly ride in the bight of the hook.

The load carrying end portion 16 of the link is provided transversely thereof with a plurality of circular apertures therethrough as are illustrated at 22, 24 and 26. These apertures or "eyes" are adapted to receive conventionally shaped and sized sling chain connecting links, such as are illustrated herein at 28—28; the chain slings per se being formed of smaller chain links as are illustrated at 30—30. The apertures 22, 24, 26, are so located in the load supporting end portion 16 of the master link 10 as to enable the chain slings 30 to hang freely therefrom in laterally spaced relation; it being understood of course that the sling chains 30 will carry at their lower ends grappling hooks 32 or the like, such as may be required according to the intended usage.

It is a particular feature of the present invention that by virtue of the construction of the load carrying end portion of the master link the sling chain receiving eyes 22, 24, 26, may be located quite closely to the outer periphery of the master link, whereby conventionally dimensioned and shaped connecting links such as shown at 28 may be accommodated therein. FIG. 5 illustrates by way of comparison, a conventional prior type master link 35 formed of bent wire stock, carrying a similar plurality of sling chains. It is to be noted that the link 35 is of necessity formed of wire stock of a sectional diameter sufficient to provide the opposite leg portions 36—36 thereof with sufficient tensile strength to carry the total load imposed on the system by the chain slings. Hence, the lower end load carrying portion 38 of the link 35 of necessity is of such large sectional diameter that conventionally shaped and sized sling connecting links such as are designated 28 cannot be accommodated thereon. Accordingly, additional larger sized connecting links such as are shown at 40 must be employed to interconnect the conventionally sized connecting links 28 with the end portion 38 of the prior type master link.

A comparison between FIGS. 2 and 5 also demonstrates how a master link of the present invention carries the loads of multiple chain slings in improved manner. Note that in the case of the conventional master link as illustrated at FIG. 5, the connection links 40 of the chain slings automatically gravitate toward the extreme bottom center portion of the master link, and thereby impose loads on the master link at positions substantially inset from the longitudinal center lines of the legs 36, 36, of the master link. Thus, the vertical legs of the master link are subjected to undesirable bending load concentrations which must be compensated for by undesirably increasing the wire size of the legs to avoid their deformation and failure. In the case of the present invention as illustrated at FIG. 2, the outermost disposed eyes 24, 26, receive and carry the outermost disposed chain slings so as to impose their tensile loadings on the master link substantially in line with the legs 12—12 of the master link; as illustrated at $x$—$x$ (FIG. 2) compared to $x'$—$x'$ (FIG. 5); thus avoiding the aforesaid problem. The centrally disposed eye 22 is provided to accommodate another chain sling if required.

Accordingly, it is to be understood that the construction of the present invention provides economies in respect to the overall weight of material required to be incorporated in the master link, because none of the parts thereof are "over-built" as in the case of conventional master links. The I-beam sectional configurations of the link parts provide optimum cross-section modulii; the forged configurations placing metal only where needed to achieve uniform stress distribution throughout the critical sections of the link. Note that as shown at FIG. 4, the leg portions 12, 12, of the link are of I-beam sectional form. However, the innermost flange portions 12a thereof are massively enlarged relative to the outer flange portions 12b, so as to provide increased resistance against inward bending and increased tensile strength in line with the loads imposed on the link through the two outermost chain slings. Also note that because the eyes 22, 24, 26, are separate one from the other and therefore each transmit to the load carrying portion 16 of the link only fractional portions of the total load to be accommodated by the link, the sectional mass of metal surrounding the eyes need only be substantially less than the requisite sectional mass of the load carrying portion of the conventional master link as illustrated at FIG. 5. Thus, the master link of the present invention is lighter in weight for the same strength capacity of equivalent conventional type master links; the use of excess metal being avoided. Furthermore, the forged links of the present invention are inherently more reliable; the reliability of conventional welded bent wire type links being proportional and dependent upon the skill of the welding operator. Still further, as explained hereinabove, the design of the master link of the invention eliminates the requirement for use of a "master coupling link" to interconnect the conventional sling coupling link to the master link; thereby reducing the variety of link components required in multiple branch type sling systems.

Whereas the drawing herewith illustrates the hook of the present invention as being provided with three separate sling chain engaging eyes 22, 24, 26, it is to be understood that any desired number of such eyes may be provided transversely of the lower body portion 16 of the link; preferably, in the order of either 2, 3, or 5 such eyes. Thus, as illustrated at FIGS. 1, 2, in the case of a three-eye link the two outer eyes may be used to engage a pair of chain slings coupled to oposite ends of a relatively wide load. On the other hand, the same link may be employed to carry only a single chain sling engaged within the centrally located eye of the link. Or, alternatively, the link may be employed as shown in FIG. 1 to carry at the same time a triple sling chain arrangement. In similar fashion a five-eye link is adapted to be utilized to support either a single chain sling (from the centrally disposed eye) or a pair of sling chains carried by the two outermost eyes of the link; or three chain slings carried by the centrally located and the two outermost eyes; or four chain slings carried by the two outermost eyes at opposite sides of the link; or five chain slings carried by the five eyes of the link. In all cases the loads transmitted through the sling chains will be symmetrically applied to and carried by the master link.

The sling chains may of course be factory assembled relative to the master link, or through use of detachable coupling type links such as are illustrated at 45, FIG. 1.

The bottom edge profile of the load carrying end portion of the link is scalloped as best shown in FIG. 3, whereby to permit the connecting links 28 of the sling chains to freely pivot within the eye sockets incidental to handling of the equipment. Also note, as best shown at FIGS. 1, 3, the outer flange portion of the legs of the link is widened at the top of the link as indicated at 46, in order to armor the top portion of the link against wear relative to the suspension device, such as the hook 20 (FIG. 1).

What we claim is:

1. A sling chain device comprising in combination:
    a master link, said master link having a generally oblong configuration defined by substantially straight opposite side leg portions, a hanging end portion joining upper ends of said leg portions and a load carrying end portion joining lower ends of said leg portions, said leg portions being of I-beam sectional form, said load carrying end portion being provided with a plurality of eyes, a pair of said eyes being disposed one eye in substantial longitudinal alignment with each of said leg portions;
    at least two sling chains; and
    at least two sling chain connecting links connected one to each of said sling chains and passing one through each eye of said pair of eyes for connecting said sling chains to said master link, said connecting links having a size exceeding the size of links of said sling chains and being sized relative to said eyes and portions of said load carrying end portion bounding said eyes as to permit said connecting links to freely pivot within said eyes relative to said master link.

2. A sling chain device according to claim 1, wherein innermost flange portions defining said I-beam sectional form of said leg portions are sectionally more massive than outermost flange portions thereof.

3. A sling chain device according to claim 1, wherein said hanging end portion is of I-beam sectional form.

4. A sling chain device according to claim 3, wherein innermost flange portions defining said I-beam sectional form of said leg portions are sectionally more massive than outermost flange portions thereof, an innermost flange portion of said I-beam sectional form of said hanging end portion essentially corresponds in sectional size to said innermost flange portions of said leg portions, and an outermost flange portion of said hanging end portion is sectionally enlarged relative to said outermost flange portions of said leg portions.

* * * * *